Figure 3:
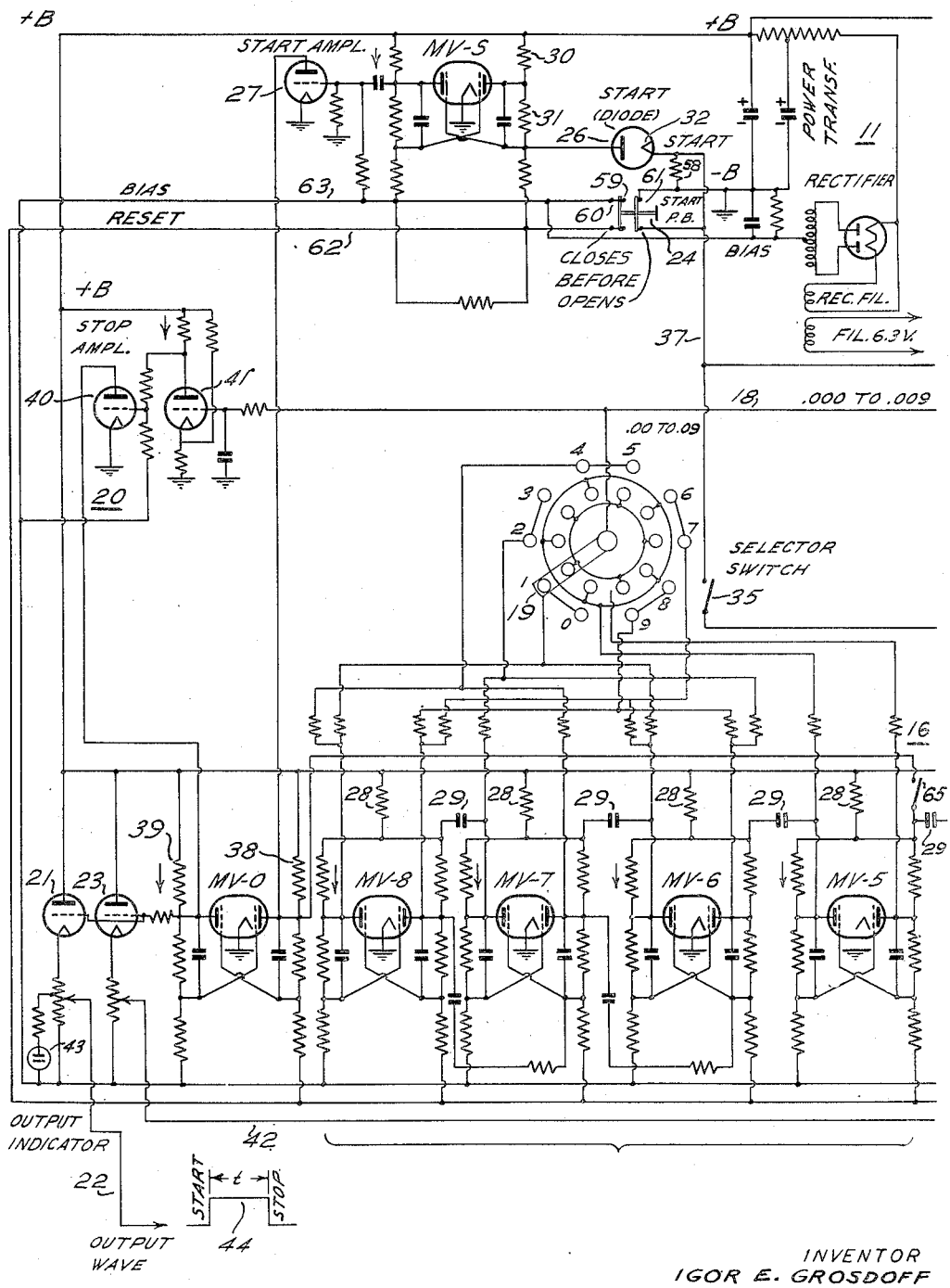

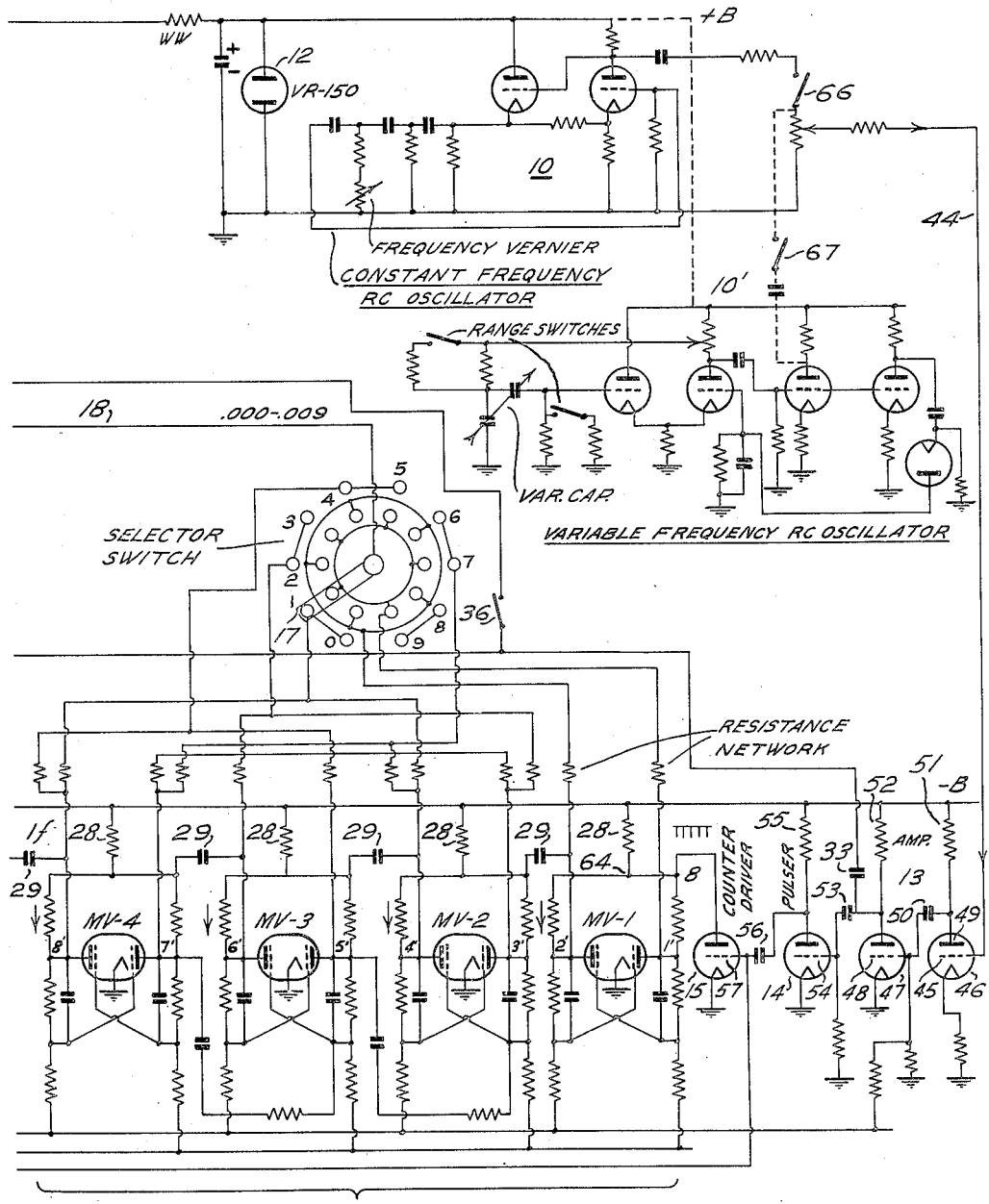
Fig.3-A.

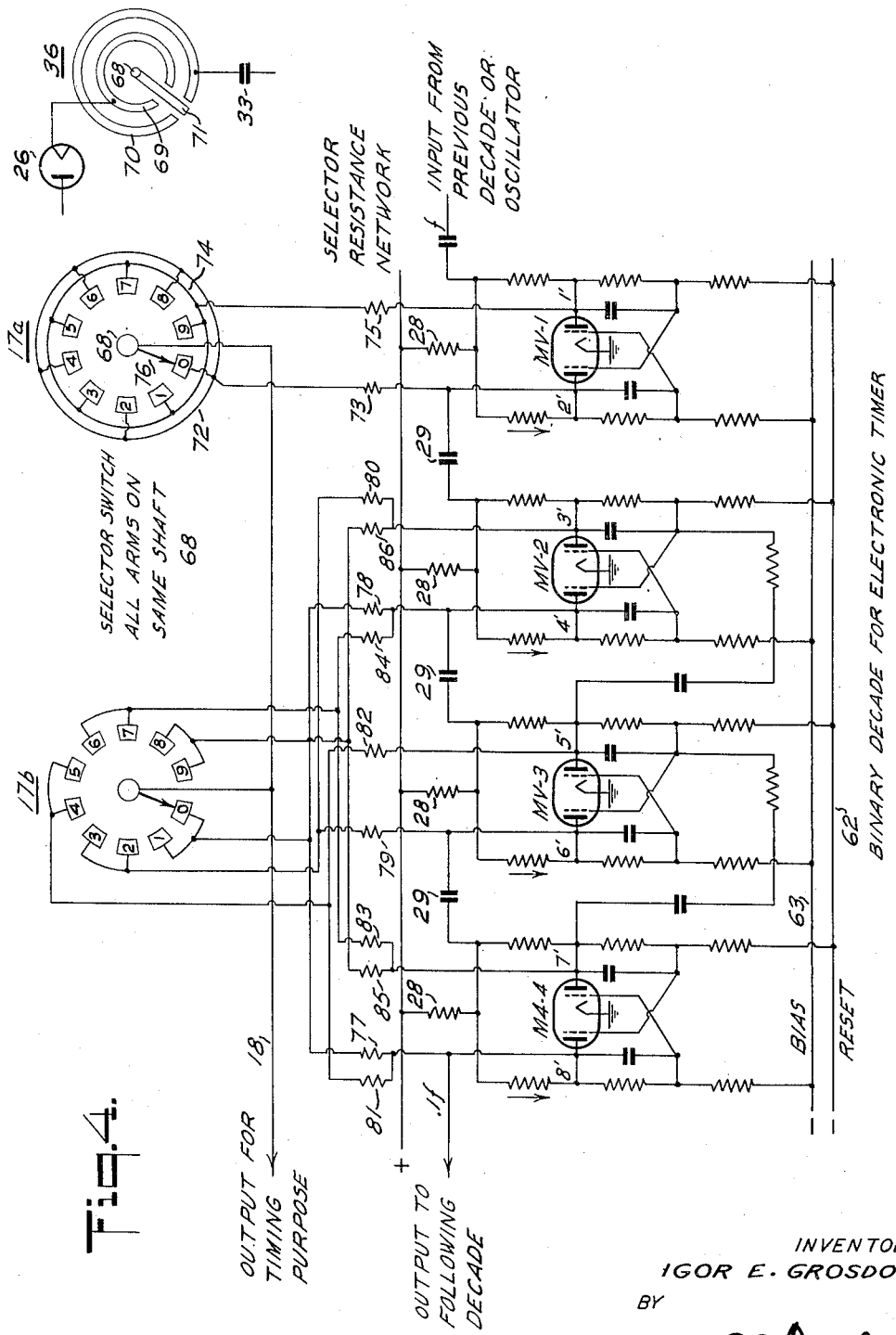

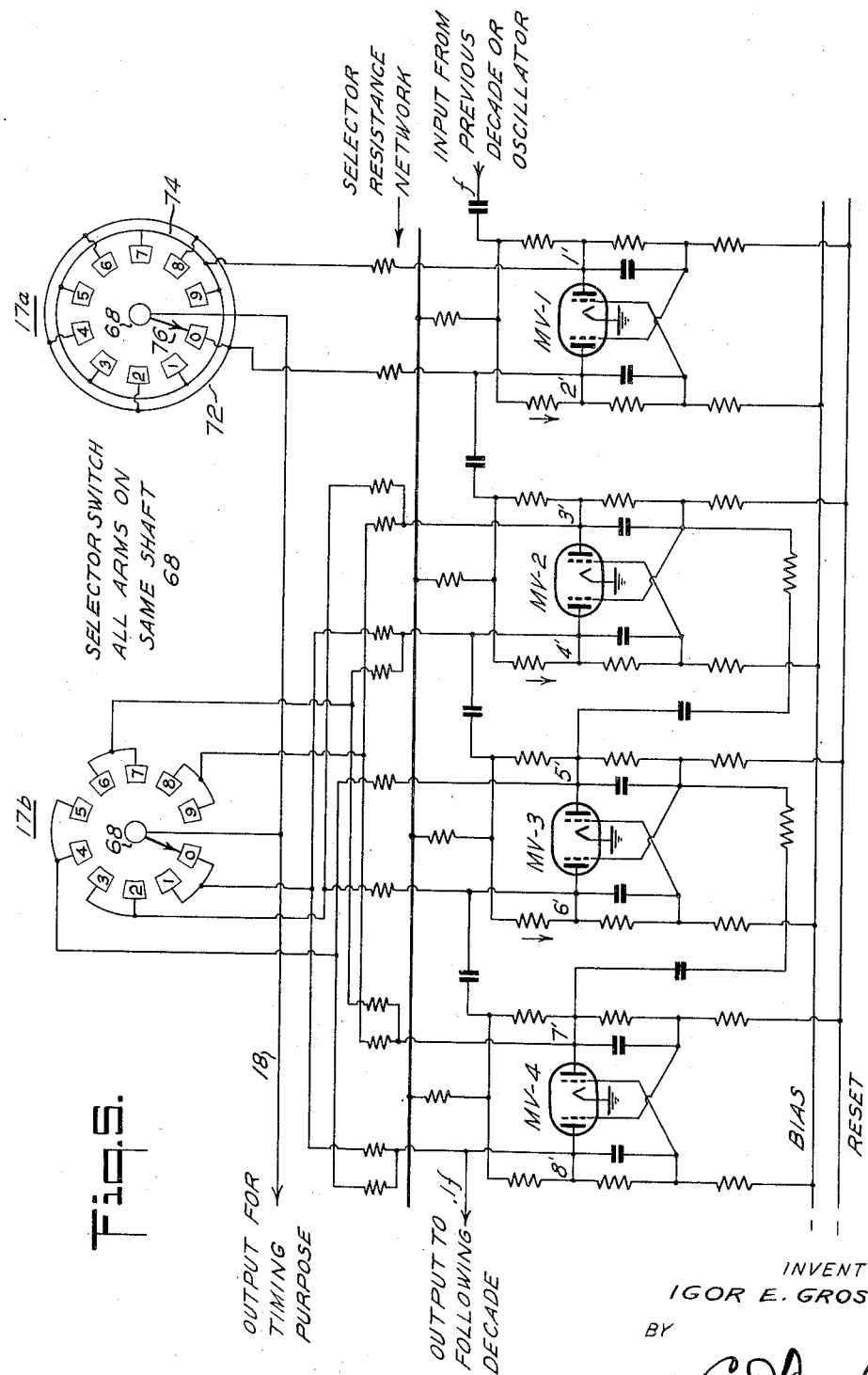

Jan. 3, 1950  I. E. GROSDOFF  2,493,627
ELECTRONIC TIME MEASURING DEVICE
Filed May 1, 1946  9 Sheets-Sheet 7
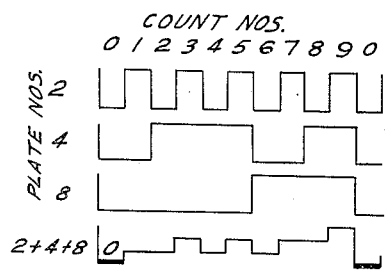
Fig.6-A.
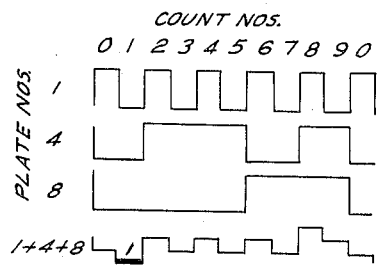
Fig.6-B.
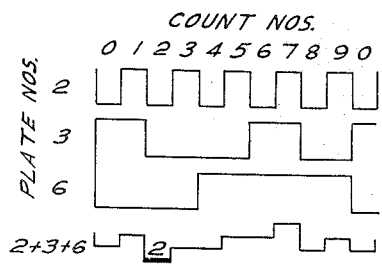
Fig.6-C.
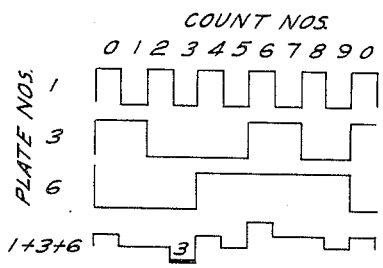
Fig.6-D.
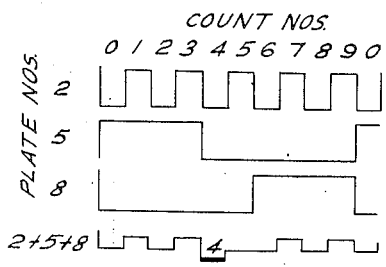
Fig.6-E.
INVENTOR
IGOR E. GROSDOFF
BY
ATTORNEY Jan. 3, 1950     I. E. GROSDOFF     2,493,627
ELECTRONIC TIME MEASURING DEVICE
Filed May 1, 1946     9 Sheets-Sheet 8
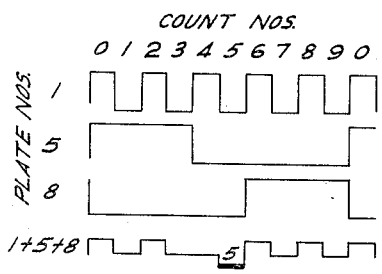
Fig. 6-F.
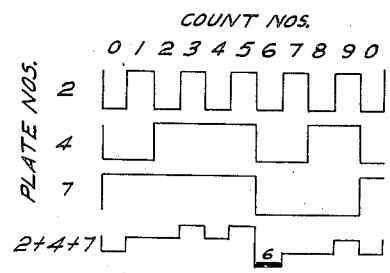
Fig. 6-G.
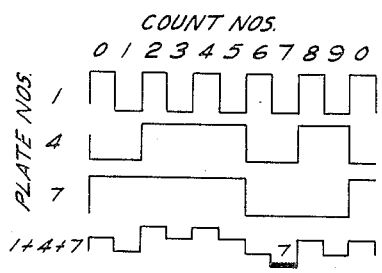
Fig. 6-H.
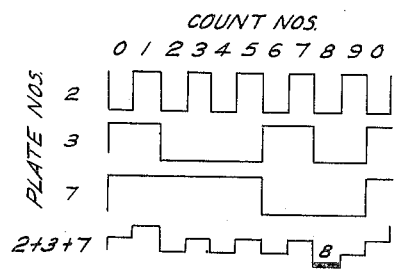
Fig. 6-I.
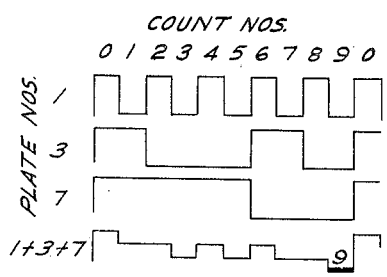
Fig. 6-J.
INVENTOR
IGOR E. GROSDOFF
BY
ATTORNEY Jan. 3, 1950        I. E. GROSDOFF        2,493,627
ELECTRONIC TIME MEASURING DEVICE Filed May 1, 1946        9 Sheets-Sheet 9

INVENTOR
IGOR E. GROSDOFF
BY
CD Duska
ATTORNEY

Patented Jan. 3, 1950

2,493,627

UNITED STATES PATENT OFFICE 2,493,627

ELECTRONIC TIME MEASURING DEVICE

Igor E. Grosdoff, Princeton, N. J., assignor to Radio Corporation of America, a corporation of Delaware Application May 1, 1946, Serial No. 666,472

3 Claims. (Cl. 250—27)

This invention relates to electronic time measuring devices such as are adapted to produce an effect at the expiration of a predetermined time interval immediately following some event such as the closing of a switch or the like. Measuring devices of this character are useful in connection with industrial processes where exact timing of the process is desired and in many other cases where limitation of an operation to a predetermined time interval is required.

As a basis for establishing the desired time interval, there is provided an oscillation generator which may be either of the constant frequency or of the variable frequency type. If it is of the constant frequency type, the time interval is measured by the number of cycles between the event and the effect. If it is of the variable frequency type, the frequency of the generator is adjusted to a value such that the time of one cycle is equal to the desired time interval, the event occurs at the beginning of this one cycle and the effect is produced at the end of this cycle. As hereinafter explained, the variable frequency generating means may include a frequency changer by which the frequency derived from it is reduced to a value better suited to the operation of the measuring device as a whole.

For maximum utility and convenience of operation, it is desirable (1) that the interval of time between the event and the effect be readily controllable or adjustable to different values, (2) that the control means be such that the selected time interval start with a cycle of the timing frequency and also end with a cycle of the timing frequency so that the interval includes a whole number of cycles, and (3) that the control means be so arranged that different timing intervals are separate and distinct from one another and can not be made to overlap by any faulty operation of the measuring device.

The improved time measuring device of the present invention facilitates the accomplishment of all these results. Thus in the case of the variable frequency modification, means are provided whereby the frequency is readily adjusted over a considerable range of values. In the case of the constant frequency modification, there are provided a number of trigger circuits of the multivibrator type which are connected in cascade and are arranged in groups each capable of completing its cycle of operation in response to any number of cycles from one to ten. To this end, there is provided a selector resistance network, through which the anodes of the trigger circuits of a given group are connected to the fixed contacts of a selector switch. This switch is provided with a movable contact member or blade which functions to select the number of cycles at which the effect is to be produced. Such a switch is provided with each group or decade of trigger circuits and the movable contacts of the switches of the different decades are connected together so that the effect is produced only when each decade has completed the number of cycles predetermined by the settings of the different selector switches. These selector switches may be of the single-pie or double-pie type depending on the connection of the selector resistance network.

In connection with both the constant frequency and the variable frequency modifications of the invention there is provided a control circuit which functions to start the count at the end of the first half cycle and to terminate the count at the end of the last half cycle. This means that the counter does not count the first or starting pulse. The actual count, however, represents the true timing interval for the reason that there is one more pulse than the number of intervals between them. Hence the count resulting from any given setting of the selector switches represents the true timing interval.

Both the constant frequency and variable frequency modifications of the invention also involve a press button or other control element which is biased to a condition such that a standby condition is established in the measuring device. Thus if this control element is released during the measurement of a predetermined time interval, the measuring device is immediately restored to its normal standby condition so that there can be no confusion between successive measurements.

Important objects of the invention are the provision of an improved device for measuring a predetermined time interval; the provision of a device which is readily adjusted to produce an effect at any predetermined time after the occurrence of a given event, the provision of a device which measures time only in whole cycles of an alternating potential, and the provision of a measuring device having its operating cycles definitely separated from one another so that there can be no confusion between successive measurements or readings.

The invention will be better understood from the following description considered in connection with the accompanying drawings and its scope is indicated by the appended claims.

Figure 1:
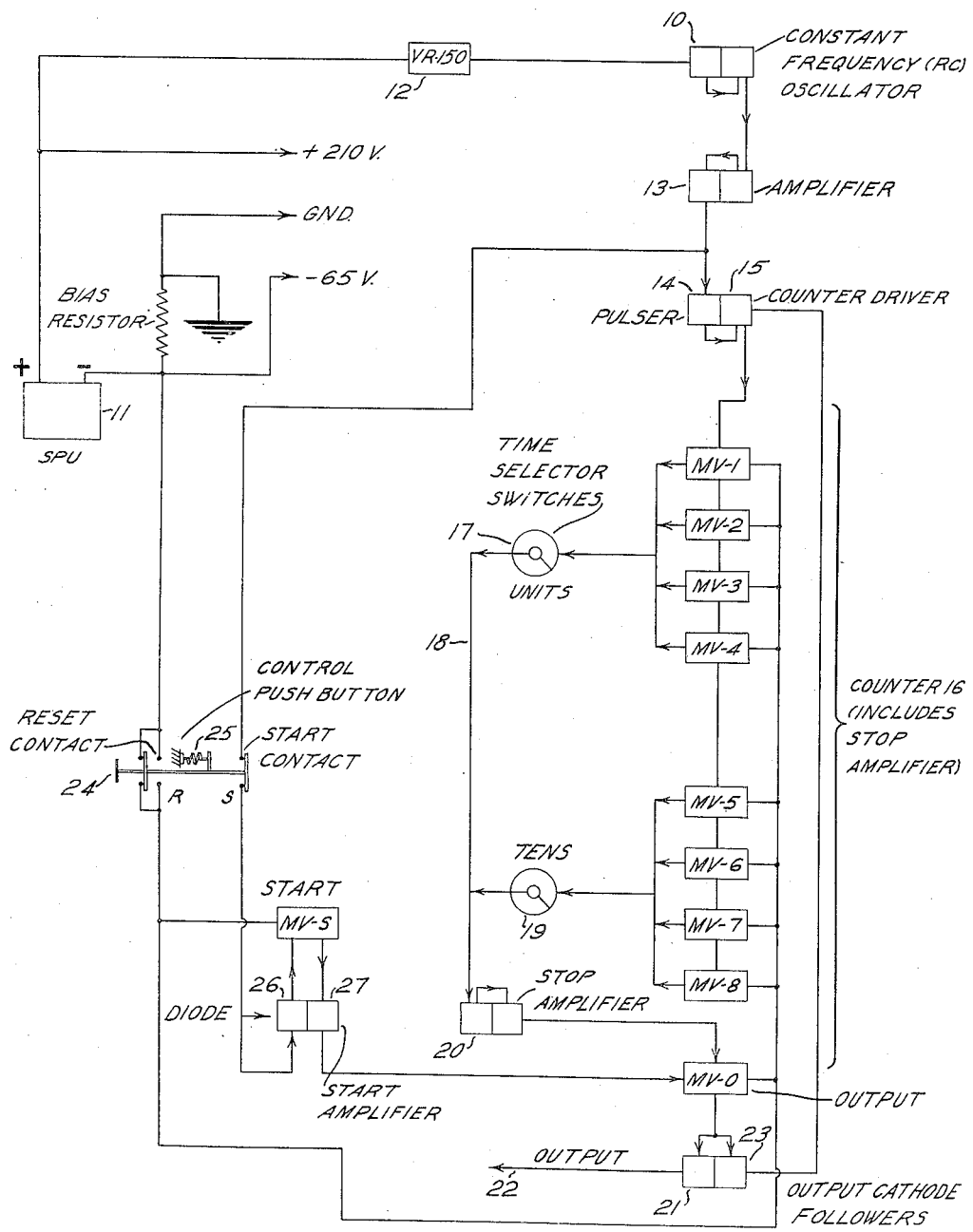
Figure 2:
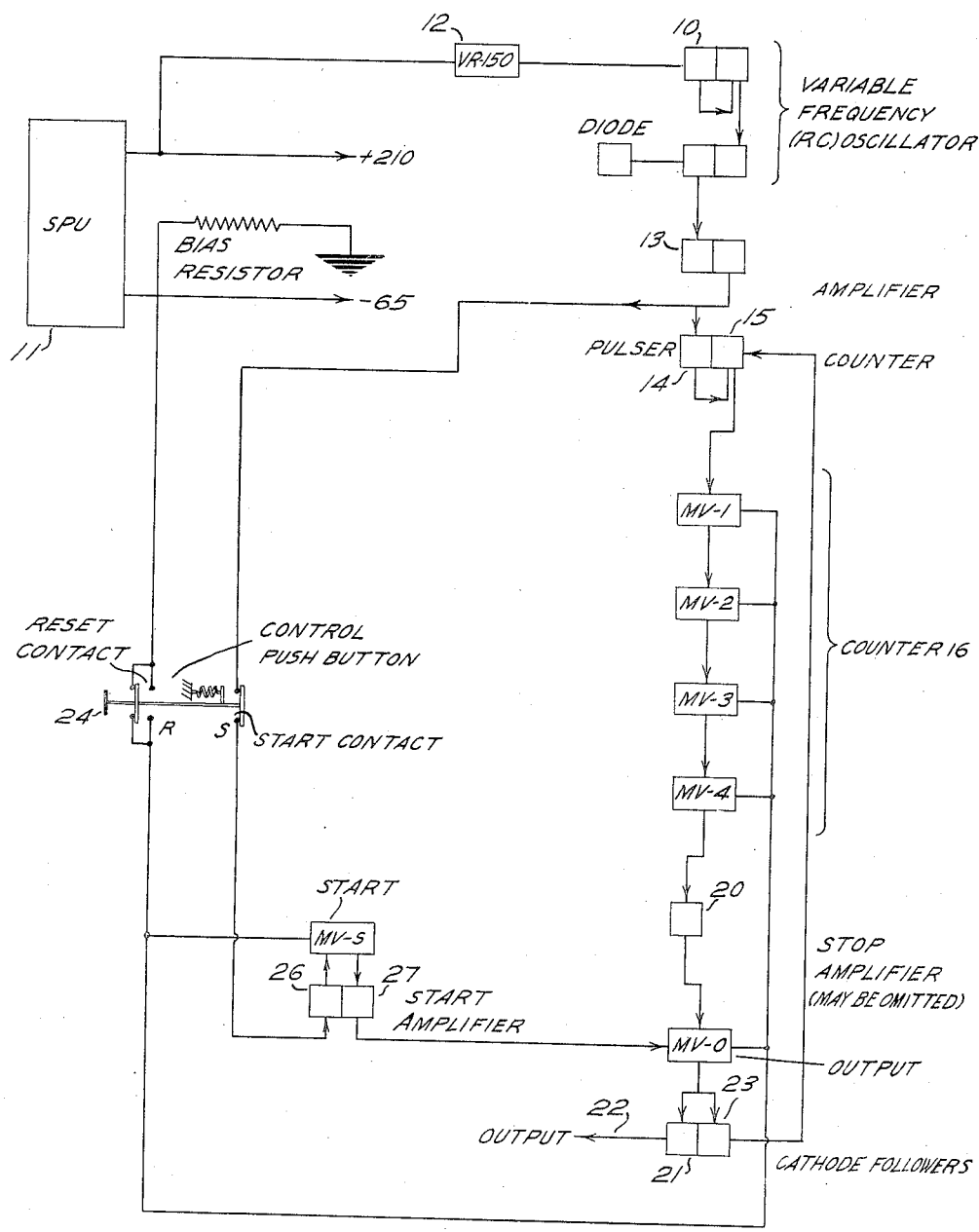

Referring to the drawings:

Fig. 1 is a block diagram of the constant frequency modification of the invention, Fig. 2 is a block diagram of the variable frequency modification of the invention, Figs. 3 and 3a are a wiring diagram of the constant frequency modification of the invention and also shows the variable frequency oscillation generator together with its relation to various parts of the measuring device, Fig. 4 illustrates certain details in the selector switch connections of one trigger circuit group or decade of the counter of Fig. 3, Fig. 5 illustrates a modified form of selector switch connection for one decade of the counter of Fig. 3, and Figs. 6a to 6j and 7 are groups of explanatory curves relating to the operation of the measuring device.

The block diagram of Fig. 1 is largely self-explanatory for the reason that it includes descriptive legends placed adjacent the respective parts of the measuring device which it depicts.

This time interval measuring device includes a constant frequency oscillation generator 10 to which operating potential is applied from a socket power unit 11 through a voltage regulator 12.

Starting of the supply of pulses from the oscillator 10 through an amplifier 13, a pulser 14 and a counter drive device 15 to the input lead of a counter 16 is controlled by a push button switch 24 provided with front and back "reset" contacts and with "start" contacts. This switch is biased by a spring 25, or the equivalent, to its illustrated left hand closed position in which it (1) causes normal bias potential to be applied to certain grids of the various trigger circuits and (2) biases a diode 26 to a condition such that a pulse can not be transmitted through the diode 26 from the amplifier 13 to a "start" trigger circuit MV—S.

To start an operating cycle of the measuring device, the switch 24 is moved to the right. As the switch 24 is moving to its right hand closed position, the application of negative bias potential to certain grids of the trigger circuits is temporarily interrupted so that these circuits are established in a standby condition with current conduction as indicated by the arrows shown in Fig. 3. When the switch 24 reaches its right hand position, (1) normal bias is restored to the grids of the trigger circuits and (2) the "start" contacts are open.

Opening of the "start" contacts, as will appear in connection with Fig. 3, puts a diode 26 into a condition such that a pulse is passed through it from the amplifier 13 to a start trigger circuit MV—S causing it to change its current conductive condition and to transmit a pulse through a start amplifier 27 to the output trigger circuit MV—O. This changes the current conductive condition of the output trigger circuit MV—O and as a result there is delivered a positive pulse from the cathode follower 21 to the output lead 22 and from the cathode follower 23 to the grid of the counter drive device 15.

When this positive pulse is applied to the control grid of the device 15, pulses are applied from the oscillator 10 through the amplifier 13, the pulser 14 and the counter drive device 15 to the input lead of the first decade MV—1 to MV—4 of the counter 16. As previously explained, the first pulse applied to the input of the decade MV—1 to MV—4 is the one immediately following the pulse by which the start trigger circuit MV—S was operated. Therefore the first cycle is not counted by the counter 16 and the correct time interval for the operating cycle of the measuring device is realized. It also follows that the count starts with the beginning of this second cycle.

The first decade of the counter 16 includes the four concatenated trigger circuits MV—1 to MV—4 which have their anodes connected through a resistance network (shown in Figs. 3 and 4) to a selector switch 17 through which a more negative potential is applied to a lead 18 when a number of cycles predetermined by the setting of the switch 17 have been applied to the input of the decade MV—1 to MV—4.

The second decade of the counter 16 includes four similar trigger circuits MV—5 to MV—8 which have their anodes connected by way of a resistance network to a selector switch 19 through which a more negative potential is applied to the lead 18 when a number of cycles predetermined by the setting of the switch 19 have been transmitted from the first decade MV—1 to MV—4 to the second decade MV—5 to MV—8.

When a more negative potential is applied to the lead 18 through both the selector switches 17 and 19, a stop amplifier 20 functions to change the current conductive condition of an output trigger circuit MV—O of the multivibrator type. The effect of this change in the current conductive condition of the trigger circuit MV—O is twofold. First, there is applied through the cathode follower 21 to the measuring device output lead 22 a potential which is more negative. Second there is a similar potential applied through the cathode follower 23 to the counter drive 15 for stopping the supply of oscillations to the first decade MV—1 to MV—4. Thus the measuring device is stopped at the end of the last cycle of a series which has its number determined by the settings of the selector switches 17 and 19. These switches may therefore be regarded as a means of adjusting or changing the operating cycle of the measuring device to provide positive and negative pulses which are separated by any desired time interval and may be utilized to intiate and terminate many different kinds of processes where exact timing is desired or essential.

The variable frequency modification of the invention illustrated by Fig. 2 is like the constant frequency modification of Fig. 1 with respect to control of the starting and stopping of the cycle of operation of the measuring device. It differs from the modification of Fig. 1 in that (1) the constant frequency oscillator 10 is replaced by a variable frequency oscillator 10' and (2) the counter 16 includes only four concatenated trigger circuits MV—1 to MV—4 which have their output connected to the output trigger circuit MV—O either directly or through the stop amplifier 20. In this case, the counter 16 serves merely to reduce the output frequency to one tenth that of the frequency of the oscillator 10'.

The wiring diagram of Figs. 3 and 3a show the complete connections of the constant frequency modification of Fig. 1 and, taken together with Fig. 2, indicates how the connections of the measuring device are modified when the variable frequency oscillator 10' is substituted for the constant frequency oscillator 10. The constructural details of the two oscillators are well known to those skilled in the art and are readily understood without detailed explanation.

The trigger circuits MV—1 to MV—4 of the first decade, MV—5 to MV—8 of the second decade, MV—S which is involved in starting the operating cycle of the measuring device and MV—O through which the output of the device is delivered are all of the well known two stability type. Thus each of these trigger circuits includes a pair of triodes, each triode of which (1) has its anode coupled to the control grid of the other triode through a capacitor which may be shunted by a resistor, (2) has operating potential applied to it from the +B lead through resistors part of which may or may not be common to the anode circuits of both triodes of the pair, and (3) has negative grid bias potential applied to its control grid through a grid lead resistor. Current is conducted by only one triode of the pair at a time and current conductivity is transferred from one of the triodes to the other in response (1) to the application of a negative pulse to a common anode terminal of the pair, (2) to the application of a positive pulse to the control grid of the triode which is not conducting, or (3) to the application of a negative pulse to the control grid of the triode which is conducting.

Thus each trigger circuit of the two decades of the counter 16 includes a resistor 28 which is common to both its anodes. In this case, the negative pulse by which current conductivity is transferred from one triode to the other of each of the pairs is applied to the common anode terminal through a coupling capacitor 29.

In the case of the start trigger circuit MV—S, however, current conduction is transferred from the left hand to the right hand triode by a negative pulse applied to the control grid of the left hand triode, this negative pulse being produced by the additional current drawn through the resistors 30 and 31 when the start contacts of the switch 24 are opened and the diode 26 is put into a condition such that its cathode has a more negative potential applied to it from the amplifier 13 through the coupling capacitor 33, the switches 35 and 36 and the lead 37.

Likewise the output trigger circuit MV—O has current conductivity transferred from its left hand triode to its right hand triode in response to a negative pulse applied to its left hand control grid when additional current is drawn through the resistor 38 by the start amplifier 27, the control grid of which becomes more positive when current conductivity is transferred from the left hand triode to the right hand triode of the start trigger circuit MV—S. The output trigger circuit MV—O has current conductivity transferred from its right hand triode to its left hand triode in response to a negative pulse applied to its right hand control grid as a result of the additional current drawn through the resistor by the second stage 40 of the amplifier 20 when the control grid of the first stage 41 of the amplifier 20 has a more negative potential applied to it through the selector switch lead 18.

When current conductivity goes to the right hand side of the output trigger circuit MV—O, a positive pulse is transmitted through the cathode follower to the output lead 22 and through the cathode follower 23 to counter drive lead 42. When current conductivity goes to the left hand side of the trigger circuit MV—O, a negative pulse is transmitted to the leads 22 and 42. A glow tube 43 may be provided to indicate the presence of the output wave which is indicated by the reference numeral 44. It is of course apparent that the length or period of this wave is determined by the setting of the selector switches 17 and 19 and by the number of decades provided in the counter 16.

Alternating potential is applied from the oscillator 10 through a lead 44 to the control grid 45 of the first stage 46 of the amplifier 13. The second stage 47 of the amplifier 13 has its control grid 48 coupled to the anode 49 of the stage 46 through a capacitor 50. With these connections, the positive half of the first cycle of the alternating potential produces more current in a resistor 51 thereby transmitting through the coupling capacitor 50 to the control grid 48 a negative pulse which functions to reduce the current drawn through a resistor 52 and to transmit a positive pulse through the coupling capacitors 33 and 53. The positive pulse transmitted through the capacitor 33, the switches 35 and 36 and the lead 37 to the cathode 32 of the diode 26 cannot affect the non-conducting condition of this diode for the reason that it merely makes the cathode more positive. The positive pulse transmitted through the capacitor 53 is applied to the control grid 54 of the pulser 14 thereby causing it to draw more current through a resistor 55 and to transmit a negative pulse through a coupling capacitor 56 to the control grid 57 of the counter driver 15. This negative pulse, however, is stopped at the counter driver for the reason that the control grid 57 is biased below cut-off by the negative potential applied to it through the lead 42 from the cathode follower 23.

The effect of the negative half of the first cycle of the potential applied to the oscillator 10 is the reverse of that of the positive half of this cycle so that negative pulses are transmitted through the capacitors 33 and 53. The negative pulse transmitted through the capacitor 53 is blocked by the counter drive 15 as previously explained. Assuming the start switch 24 to be held in its left hand closed position so that the cathode 32 is connected to ground through a resistor 58 instead of being directly grounded through the right hand contacts of the switch 24, the negative pulses transmitted through the capacitor 33 the switches 34, 35 and 36 and the lead 37 to the cathode 32 causes the diode 26 to take more current. This current is drawn through resistors 30 and 33 with the result that a negative pulse is applied to the left hand grid of the start trigger circuit MV—S, the start amplifier 27 draws more current through the resistor 38, a negative pulse is applied to the left hand grip of the output trigger circuit MV—O, current conduction is transferred to the right hand side of the trigger circuit MV—O, a more positive potential is applied to the grids of the cathode followers 21 and 23 and more positive potentials are applied to the leads 22 and 42.

The more positive potential of the lead 42 is applied to the control grid 57 of the counter driver 15 so that this counter driver is now in condition to transmit pulses applied to its grid 57 through the coupling capacitor. It is apparent that this unblocking of the counter driver does not occur until the end of the first half cycle after movement of the switch 24 to its left hand closed position.

In moving from its right hand closed position to its left hand closed position, the switch first opens the contacts 59, then closes the contacts 60 and last opens the contacts 61. Opening of the contacts 59 disconnects the reset lead 62 from the negative bias lead 63 so that a less negative potential is applied to the left hand grids of the trigger circuits MV—S, MV—O and MV—1 to MV—8 so that all these triggers have current conductivity established in their left hand triodes as indicated by the arrows. Closing of the contacts 60 restores normal negative bias to the left hand diodes of the various trigger circuits. Opening of the contacts 61 removes the short circuit from the cathode resistor 58 of the diode 26.

With the counter drive 15 unblocked at the end of the first half cycle as explained above and with the switch 24 still held in its left hand closed position so that the cathode 32 of the diode 26 is connected to ground only through the resistor 58, the positive half of the second cycle of the alternating potential causes positive pulses to be transmitted through the capacitors 33 and 53. The positive pulse thus applied through the capacitor 33 to the cathode 32 of the diode 26 does not change the current of this diode sufficiently to affect the conductive condition of the trigger circuit MV—S. The positive pulse transmitted through the capacitor 53 results in a negative pulse at the grid 57 of the counter driver 15. This means that less current is drawn by the counter driver 15 through the resistor 28 of the trigger circuit MV—1 and that a positive pulse is applied to the common anode terminal 64 of this trigger circuit. Such a positive pulse is ineffective to change the current conductive condition of the trigger circuit. It therefore follows that the positive half of the second cycle of the alternating potential is ineffective to start the count of the counter 16 or to change the current conductive condition of the start trigger circuit MV—S.

The negative half of the second cycle of the alternating potential produces a positive pulse at the grid 57 of the counter driver 15 and a negative pulse at the cathode 32 of the diode 26. The resulting negative pulse at the left hand grid of the trigger circuit MV—S has no effect on the current conductive condition of this trigger circuit for the reason that its left hand triode is already non-conductive. The positive pulse applied to the grid 57 of the counter driver 15 causes the counter driver to draw more current through the resistor 28 of the trigger circuit MV—1 so that a negative pulse is applied to its common anode terminal 64 and current conduction is transferred from its left hand triode to its right hand triode. A count of one is thus established for the second cycle of the alternating potential.

Successive cycles of the alternating potential up to a number determined by the settings of the selector switches 17 and 19 are counted by the counter 16 in a well known manner. When the predetermined number of cycles has been reached, the selector switch lead 18 assumes its most negative potential (as hereinafter explained in connection with Fig. 4), the amplifier stage 41 is biased down, the amplifier stage 40 is biased up more current is drawn through the resistor 39, a negative pulse is applied to the right hand grid of the trigger circuit MV—O, current conduction is transferred to the left hand side of this trigger circuit, the potentials of the grids of the cathode followers 21 and 23 are made more negative, and more negative potentials are applied to the leads 22 and 42 thus terminating the output pulse 44 and biasing of the counter driver 15.

This completes the operating cycle of the constant frequency modification of the time interval measuring device. Upon release of the switch 24, it returns to its right hand closed position thus ensuring (1) that current conduction is in the left hand triodes of the various trigger circuits and (2) that the diode 26 is biased off so that the measuring device is insensitive to subsequent successive cycles of the alternating potential applied from the oscillator 10.

Substitution of the variable frequency oscillator 10' in the time interval measuring device is readily effected by opening the selector switch 19, setting the switch 17 at 0, opening the switch 36, closing a switch 65 by which the output lead of the first decade MV—1 to MV—4 is connected to the left hand grid of the trigger circuit MV—O, opening a switch 66 by which the measuring device input lead 44 is disconnected from the constant frequency oscillator 10 and closing a switch 67 by which the variable frequency oscillator 10' is connected to the lead 44.

With these connections, the first cycle of alternating potential following closure of the switch 24 to the left functions, as previously explained, to make the leads 22 and 42 more positive this starting the output cycle through 44 and unblocking the counter driver 15. The next successive cycles of alternating potential are counted in the first decade MV—1 to MV—4 of the counter 16. When the count of this decade is completed, there is applied through the switch 65 to the left hand grid of the trigger circuit MV—O a positive pulse as the result of which current conductivity is transferred from the right hand triode to the left hand triode of the trigger circuit MV—O. This makes the leads 22 and 42 more negative thereby terminating the output pulse 44 and biasing off the counter driver 15.

With the decade MV—1 to MV—4 connected in the circuit as illustrated, the frequency of the output wave 44 is one-eighth that of the applied alternating potential. Higher frequency of the output wave 44 may be realized by omitting some or all of the trigger circuits of the first decade of the counter. Lower frequencies of the ouput wave may be realized by including more trigger circuits of the counter.

As indicated by the legend adjacent the switch 36, the switches 35 and 36 are mounted on the same shafts as the switches 19 and 17 respectively so to be open only in the 0 position of the switches 17 and 19.

How the selector switches function to predetermine the time of the operating cycle of the measuring device is better understood in connection with Figs. 4, 6a to 6j and 7. Since the different decades of the counter 16 are alike, consideration of only the first decade MV—1 to MV—4 is required.

Fig. 4 shows the selector switch 17 as separated into its three component parts 36, 17a and 17b. All these components include a common operating shaft 68.

The component 36 includes a pair of slip rings 69 and 70 which are connected respectively to the cathode of the diode 26 and through the coupling capacitor 33 to the anode of the amplifier stage 47 (see Fig. 3). Associated with the slip rings 69 and 70 is a blade 71 by which these slip rings are connected together in every closed position of the selector switch with the exception of the zero position where there would otherwise result a potential capable of producing undesired operation of the measuring device.

The component 17a of the selector switch 17 includes a conductor 72 which is connected (1) to the even numbered fixed contacts 0, 2, 4, 5 and 8 of the switch 17 and (2) to the left hand anode of the trigger circuit MV—1 through a resistor 73. The selector switch 17 also includes a conductor 74 which is connected (1) to the odd numbered fixed contacts 1, 3, 5, 7 and 9 of the switch 17 and (2) to the right hand anode of the trigger circuit MV—1 through a resistor 75. With these connections, the odd numbered fixed contacts 1, 3, 5, 7 and 9 are more negative when the number of input pulses is odd, and the even numbered fixed contacts 0, 2, 4, 6 and 8 are more negative when the number of input pulses is even. Selection between the two groups of contacts is made by a switch blade 76 which is mounted on the rotatable shaft 68 and is connected to the selector output lead 18.

The component 17b of the switch 17 includes five separate pairs of fixed contacts 0—1, 2—3, 4—5, 6—7, and 8—9. The pair 0—1 is connected through a resistor 77 to the left hand anode of the trigger circuit MV—4 and through a resistor 78 to the left hand anode of the trigger circuit MV—2. The pair 2—3 is connected through a resistor 79 to the left anode of MV—3 and through a resistor 80 to the right anode of MV—2. The pair 4—5 is connected through a resistor 81 to the left anode of MV—4 and through a resistor 82 to the right anode of the MV—3. The pair 6—7 is connected through a resistor 83 to the right anode of MV—4 and through a resistor 84 to the left anode of MV—2. The pair 8—9 is connected through a resistor 85 to the right anode of MV—4 and through a resistor 86 to the right anode of MV—2.

Figure 7:
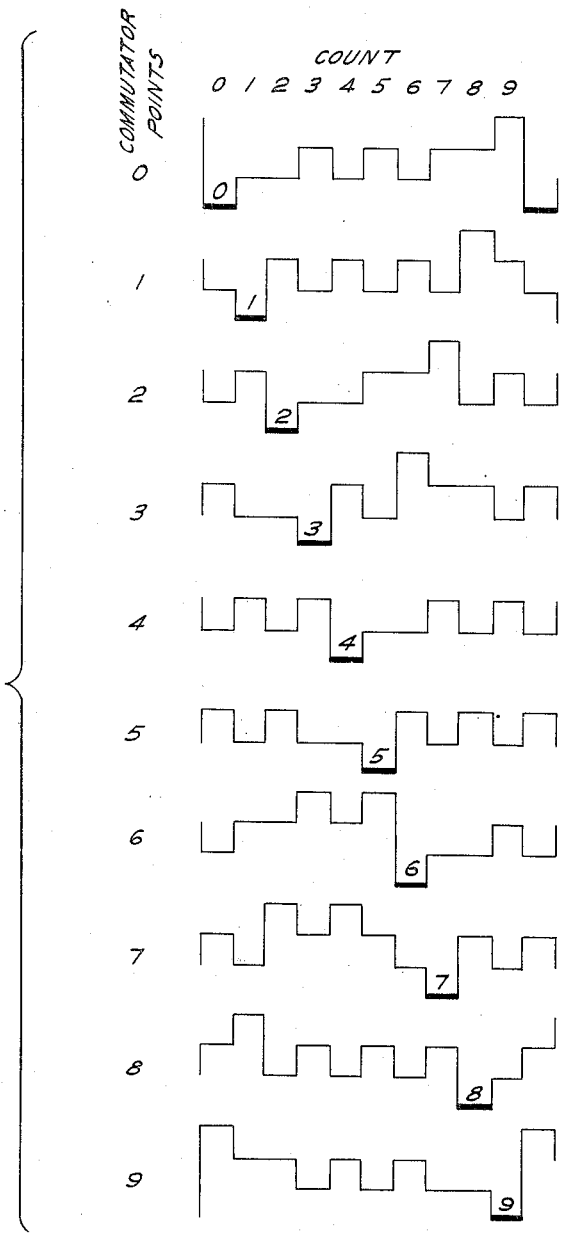

How the potentials of the fixed contacts of the switch components 17a and 17b combine to produce a progression of a given negative potential from one contact of the switch 17 to the next as pulses are applied to the input of the decade is shown by the curves of Fig. 7. Thus when the count is zero, the most negative potential is at the left hand end of the curve. This part of the curve represents the position 0 of the switch 17. As the count increases, the most negative potential appears successively at the points 1, 2, 3, 4, 5, 6, 7, 8 and 9 which represent correspondingly number contacts of the switch 17.

Figs. 6a to 6j illustrate how the potentials of the anodes 1' to 8' (see Fig. 4) are combined to produce the commutating negative potential which moves progressively from the fixed contact 0 over the fixed contacts 1 to 9 in response to successive input pulses or cycles of the alternating potential applied to the lead 44.

Thus Fig. 6a shows the potentials of the anodes 2', 4', and 8' combined to produce the more negative potential at the contact 0, Fig. 6b shows how the potentials of the anodes 1', 4', and 8' are combined after the first counted cycle to produce the more negative potential at the contact 1, Fig. 6c shows how the potentials of the anodes 2', 3' and 6' are combined after the second counted cycle to produce the more negative potential at the contact 2, etc.

When the count of the decade MV—1 to MV—4 has been completed, one pulse is counted on the second decade and the operating cycle of the first decade is repeated until there is applied from both selector switches 17 and 19 to the selector switch lead 18 the more negative potential by which the count is terminated as previously explained.

The time interval of the count obviously may be anything from one cycle to twenty cycles with the two decades illustrated in the drawings. If additional decades are added, the maximum measurable time interval is increased accordingly.

Fig. 5 is like Fig. 4 with the exception that the selector resistance network is modified to permit the combination of the switch components 17a and 17b into a single switch component 17ab. It will be noted that this modified network includes twice as many resistors as the network of Fig. 4. How it functions to combine the potentials of the anodes 1' to 8' to produce the more negative potential which progresses from one fixed contact to another is readily understood from what has been said in connection with Fig. 4.

The invention herein disclosed is thus characterized by the fact that it (1) permits the selection of any desired time interval, (2) measures such time interval only in whole cycles of either a constant or a variable alternating potential, (3) can not be operated to produce confusion between successive measured time intervals, and (4) requires only a relatively small number of vacuum tubes to produce a square wave output pulse of any desired frequency.

I claim as my invention:

1. The combination of a counter including a plurality of concatenated trigger circuits each of the type wherein a pair of triode elements have their anodes and grids cross-connected so that current conduction is stable in one or the other anode of said pair, a source of alternating potential, means including a gate triode having its grid coupled to said source and having its anode coupled to the first of said concatenated circuits, means for biasing said gate triode to cutoff, means including a diode having its cathode coupled to said source of alternating current and grounded through a resistor, a start switch connected in shunt to said resistor and means including said diode responsive to a first cycle of said alternating potential following the opening of said switch for controlling said biasing means to bias on said gate triode so that the next cycle of said alternating potential is applied to said first concatenated circuit.

2. The combination of a counter including a plurality of concatenated trigger circuits each of the type wherein a pair of triode elements have their anodes and grids cross-connected so that current conduction is stable in one or the other anode of said pair, a source of alternating potential, means including a gate triode having its grid coupled to said source and having its anode coupled to the first of said concatenated circuits, means for biasing said gate triode to cutoff, means including a diode having its cathode coupled to said source of alternating current and grounded through a resistor, a start switch connected in shunt to said resistor, means including said diode responsive to a first cycle of said alternating potential following the opening of said switch for controlling said biasing means to bias on said gate triode so that the next cycle of said alternating potential is applied to said first concatenated circuit, selector means connected to the anodes of said concatenated circuits for producing a predetermined potential in response to any selected count within the counting range of said counter, and means responsive to said predetermined potential for controlling said biasing means to bias off said gate triode.

3. The combination of a counter including a plurality of concatenated trigger circuits each of the type wherein a pair of triode elements have their anodes and grids cross-connected so that current conduction is stable in one or the other anode of said pair, a source of alternating current potential, means including a diode having its cathode coupled to said source and grounded through a resistor, means for applying said alternating potential to the first of said concatenated circuits, selector means connected to said anodes for producing a predetermined potential in response to any selected count within the counting range of said counter, gate means for controlling the application of said alternating potential to said first concatenated circuit, gate control means, ganged reset and start switches, means for biasing said switches to a condition such that said counter is established in a standby condition, and means including said diode coupled to said source and said gate control means responsive to operation of said start switch for applying a first cycle of alternating potential to said gate control means whereby said gate means is energized to apply the next cycle of said alternating potential to said first concatenated circuit.

IGOR E. GROSDOFF.

REFERENCES CITED

The following references are of record in the file of this patent:

UNITED STATES PATENTS

| Number | Name | Date |
|---|---|---|
| 2,411,648 | Braver et al. | Nov. 26, 1946 |
| 2,422,698 | Miller | June 24, 1947 |

OTHER REFERENCES

Electronics, June 1944, "A Four-Tube Counter Decade," by Potter, Pages 110–113, 358 and 360.